(12) United States Patent
Mantelatto et al.

(10) Patent No.: US 8,357,508 B2
(45) Date of Patent: Jan. 22, 2013

(54) PROCESS FOR EXTRACTING AND RECOVERING POLYHYDROXYALKANOATES (PHAS) FROM CELLULAR BIOMASS

(75) Inventors: Paulo Eduardo Mantelatto, Piracicaba (BR); Nazareno Antonio Sertori Durao, Brodowski (BR)

(73) Assignee: PHB Industrial S.A., Serrana-SP (BR)

( * ) Notice: Subject to any disclaimer, the term of this patent is extended or adjusted under 35 U.S.C. 154(b) by 1497 days.

(21) Appl. No.: 11/817,771

(22) PCT Filed: Mar. 6, 2006

(86) PCT No.: PCT/BR2006/000039
§ 371 (c)(1),
(2), (4) Date: Oct. 17, 2007

(87) PCT Pub. No.: WO2006/092033
PCT Pub. Date: Sep. 8, 2006

(65) Prior Publication Data
US 2008/0193987 A1 Aug. 14, 2008

(30) Foreign Application Priority Data
Mar. 4, 2005 (BR) ................................. 0501844

(51) Int. Cl.
*C12Q 1/54* (2006.01)
*C12P 7/62* (2006.01)
*C12P 7/00* (2006.01)

(52) U.S. Cl. ..................... 435/41; 435/135; 435/132
(58) Field of Classification Search .............. 435/41
See application file for complete search history.

(56) References Cited

U.S. PATENT DOCUMENTS

| 3,107,172 A | 10/1963 | Baptist et al. |
| 4,310,684 A | 1/1982 | Vanlautem et al. |
| 4,562,245 A | 12/1985 | Stageman et al. |
| 4,705,604 A | 11/1987 | Vanlautem et al. |
| 5,213,976 A | 5/1993 | Blauhut et al. |
| 6,043,063 A | 3/2000 | Kurdikar et al. |
| 6,087,471 A | 7/2000 | Kurdikar et al. |

FOREIGN PATENT DOCUMENTS

| DE | 239609 C1 | 10/1911 |
| EP | 14490 B1 | 8/1980 |
| EP | 36699 B2 | 9/1987 |
| EP | 479043 A1 | 4/1992 |
| EP | 1455233 A3 | 9/2004 |
| WO | WO9846783 A1 | 10/1998 |
| WO | WO2005052175 A3 | 6/2005 |

OTHER PUBLICATIONS

Nonato et al., 2001, Applied Microbiology and Biotechnology, 57, pp. 1-5.*

* cited by examiner

*Primary Examiner* — Ruth Davis
*Assistant Examiner* — Sheridan Macauley
(74) *Attorney, Agent, or Firm* — Fish & Richardson P.C.

(57) ABSTRACT

A process for extracting and recovering polyhydroxyalkanoates (PHAs) from cellular biomass comprising the steps of: extracting the polyhydroxyalkanoate with at least one non-halogenated solvent which is non-aggressive to the environment; heating the cellular biomass, in order to form a suspension comprising PHA solvent with the dissolved PHA and insoluble residues; recovering the solvent enriched with PHA; injecting the PHA-enriched solvent in a vapor flow in order to rapidly promote the complete precipitation of PHA in water, while processing the solvent evaporation; depleting the residual solvent; separating the purified PHA particles from the suspension and drying them.

14 Claims, 1 Drawing Sheet

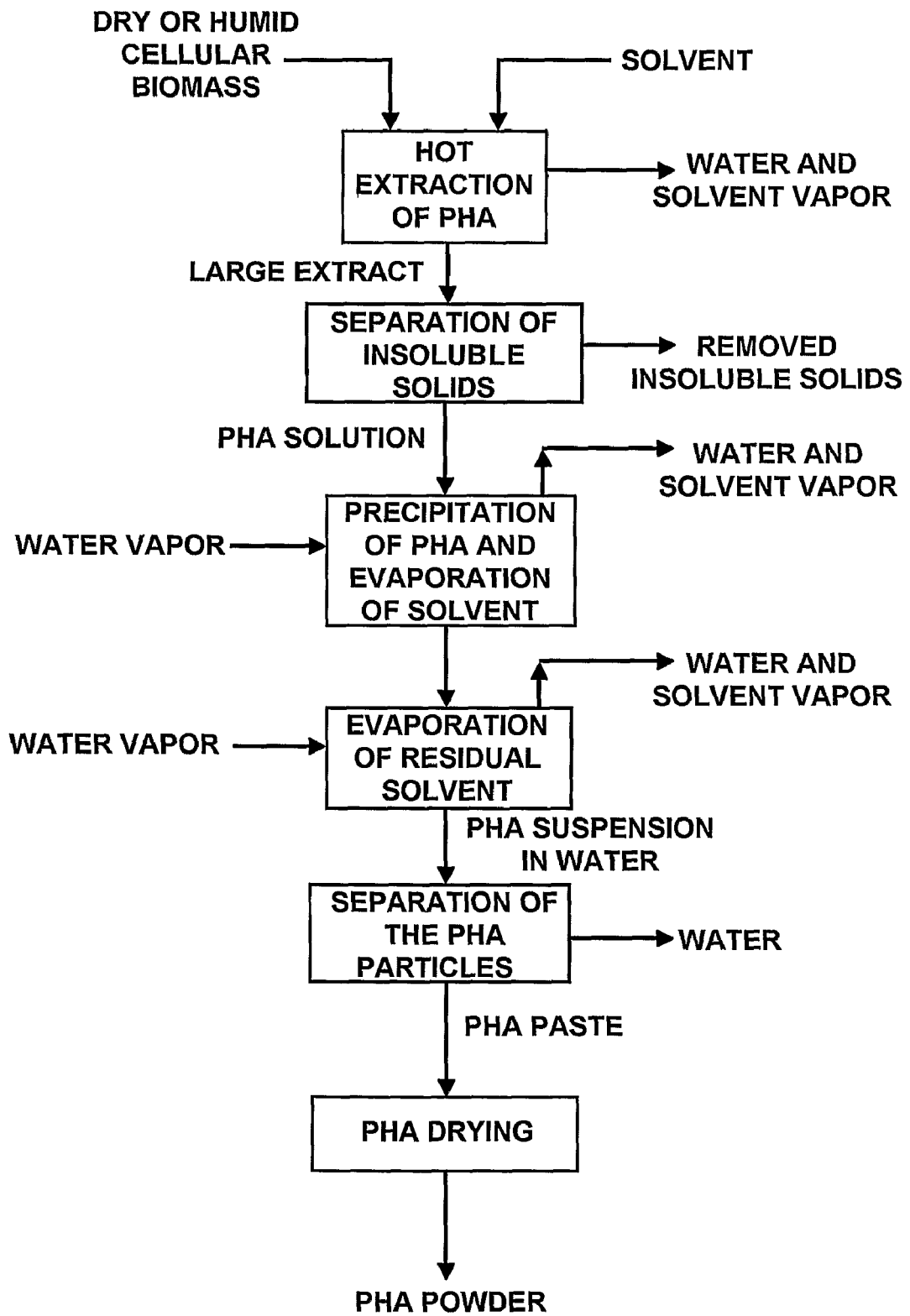

PROCESS FOR EXTRACTING AND RECOVERING POLYHYDROXYALKANOATES (PHAS) FROM CELLULAR BIOMASS

CROSS REFERENCE TO PRIOR APPLICATION

This application is the U.S. national phase of International Application No. PCT/BR2006/000039, filed Mar. 6, 2006, which claims priority from Brazilian Patent Application No. PI0501844-7, filed Mar. 4, 2005, the disclosure of both are incorporated herein by reference in their entirety. The International Application was published in English on Sep. 8, 2006 as WO 2006/092033 under PCT Article 21(2).

FIELD OF THE INVENTION

The present invention refers to a process for the extraction and recovery of polyhydroxyalkanoates (PHAs) from a bacterial cellular biomass, by employing non-halogenated PHA solvents which are not aggressive to the environment, which process allows obtaining polyhydroxyalkanoates (PHAs) of high purity and high molecular weight.

BACKGROUND OF THE INVENTION

It is presently known in the worldwide industry the need to produce biodegradable and biocompatible materials by using renewable raw materials and energy sources through processes that are not aggressive to the environment.

In modern society, the use of plastic materials in large scale is leading to a diversity of increasingly serious environmental problems. In view of these problems, the development of biodegradable plastic resins has been receiving worldwide attention, mainly those produced by means of a clean technology using renewable sources. The applications of these biodegradable biopolymers with best chances of being successful in the market involve products, such as disposable materials, for example packages, cosmetic and toxic agrochemical recipients, medical and pharmaceutical articles, as described in the introduction of Brazilian patent application PI04005622-1 (PCT/BR04/000237) of the same applicant. An important family of the biodegradable biopolymers is the polyhydroxyalkanoates (PHAs), which are polyesters naturally synthesized by a large number of live beings. With more than 170 representatives described in the literature, the commercial interest in PHAs is directly related not only to the biodegradability but also to their thermo-mechanical properties and production costs. Thus, only some PHAs have found industrial application, the most representatives being PHB (poly-3-hydroxybutyrate), PHB-V (poly(hydroxybutyrate-co-hydroxyvalerate)), P4HB (poly(4-hydroxybutyrate)), P3HB4HB (poly(3-hydroxybutyrate-co-4-hydroxybutyrate)) and some PHAmcl (polyhydroxyalkanoates of medium chain), the typical representative of this last family being PHHX (polyhydroxyhexanoate).

The chemical structure of the PHAs may be described as a polymeric chain formed by repetitions of the following unit:

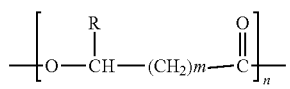

Where R is an alkyl or alkenyl group of variable length and m and n are integers, in the polymers mentioned above R and m assuming the following values:

PHB: R=$CH_3$, m=1
PBH-V: R=$CH_3$ or $CH_3$—$CH_2$, m=1
P4HB: R=H, m=2
P3HB-4HB: R=H or $CH_3$, m=1 or 2
PHHX: R=$CH_3$—$CH_2$—$CH_2$—, m=1

The great development of the natural sciences in the last two decades, particularly in biotechnology, has allowed the use of the most different natural or genetically modified organisms in the commercial production of PHAs. Particularly relevant for the present invention is the use of determined bacterial strains, which are able to produce and to accumulate expressive quantities of these polymers in their interior. Cultivated in specific conditions, which allow reaching high cellular density, high content of intracellular polymer and yields compatible with the industrial process, these bacterial strains can use different renewable raw materials, such as sugarcane juice, molasses or hydrolyzed cellulose extracts.

Although attempts have been made for applying the bacterial cells in natura (without using PHA solubilizing agents), as moldable material, such as disclosed in U.S. Pat. No. 3,107,172, the commercial applications of PHAs in most cases require its purity to be sufficiently high to attain the desired plastic properties. In order to achieve the appropriate level of purity for processing the biopolymer, especially PHAs, there are normally required steps in which the utilization of solvents for extraction and recovery of the PHA from the residual biomass is obligatory.

In patent EPA-01455233 A2, there are described several possibilities to carry out the digestion of an aqueous suspension of cells containing PHA, by using enzymes and/or surfactants to solubilize the non-PHA cellular material, considering that the enzymes are very expensive and cannot be recovered in the process, unlike what occurs when the solvent is used. Also, high dilution of the cellular material is required, which leads to a great volume of effluents generated in the process.

The usually proposed extraction processes basically consist in exposing the dry or humid cellular biomass containing the biopolymer to a vigorous contact with a solvent that solubilizes it, followed by a step in which the cellular residue (debris) is separated. The solution containing the biopolymer then receives the addition of an insolubilizing agent, which induces its precipitation in the solvent (see, for example, Brazilian patent PI 9103116-8 filed on Jul. 16, 1991 and published on Feb. 24, 1993).

In the extraction processes through organic solvents, the solvents utilized are partially halogenated hydrocarbons, such as chloroform (U.S. Pat. No. 3,275,610), methylene-ethanol chloride (U.S. Pat. No. 3,044,942), chloroethanes and chloropropanes with boiling point within the range from 65 to 170° C., 1,2,3-dichloroethane and 1,2,3-trichloropropane (patents EP-0014490 B 1 and EP 2446859).

Other halogenated compounds, such as dichloromethane, dichloroethane and dichloropropane are cited in U.S. Pat. No. 4,562,245 (1985), U.S. Pat. No. 4,310,684 (1982), U.S. Pat. No. 4,705,604 (1987) and in European patent 036,699 (1981) and German patent 239,609 (1986).

The processes of extraction and purification of biopolymers from biomass which utilize halogenated solvents are totally prohibitive nowadays, since they are highly aggressive to the environment and to human health. Therefore, a solvent to be used as a potential extractor of the biopolymer from a cellular biomass should first fulfill the condition of not being aggressive to the environment.

In this sense, Brazilian patent PI 9302312-0 (filed on 1993 and granted on Apr. 30, 2002) presents a process of extracting biopolymer from bacterial biomass which employs as solvents high chain alcohols with 3 carbons or the acetates derived therefrom. This patent prefers isoamyl alcohol (3-methyl-1-butanol), amyl acetate (or amyl-acetic ester) and fusel oil, a mixture of high alcohols obtained as a by-product of the alcoholic fermentation and which has as main component the isoamyl alcohol. This patent is also characterized for using a single solvent as extractor and purifier, not requiring the utilization of an insolubilizing agent or counter-solvent and/or marginal non-solvent. The precipitation of the solute (biopolymer) of the PHA solution is carried out by cooling the solution.

U.S. Pat. No. 6,043,063 (filed on Apr. 14, 1998 and granted on Mar. 28, 2000), U.S. Pat. No. 6,087,471 (filed on Apr. 14, 1998 and granted on Jun. 11, 2000) and the international patent application WO-98/46783 (filed on Apr. 15, 1997) mention an extensive list of non-halogenated solvents which could be potentially employed as solvents for extracting biopolymer from biomass, but many of them presenting characteristics such as difficult industrial manipulation, toxicity, besides high cost. In said extensive list, which also includes the solvents cited in Brazilian patent PI 9302312-0, only a small number of solvents have potential to be industrially used for extracting biopolymer from bacterial or vegetal biomass either due to problems regarding incompatibility with the biopolymer, or due to their toxicity, explosiveness, and high cost.

Since the biopolymers are heat sensitive, that is when submitted to temperatures above a determined value, they degrade irreversibly, losing molecular weight, which can definitively affect the properties that characterize them as thermoplastics, it is fundamental to have in mind that the list of solvents with potential to be industrially used becomes even more restricted. The potential for industrial utilization of the solvent elected to promote the extraction of the biopolymer will be increased if it is associated with an appropriate process that allows extracting the biopolymer without causing significant alterations in its molecular weight. Although various applications use PHA with low molecular weight in the range from 10,000 to 50,000, it is desirable molecular weights superior to 500,000 Da in a much greater range of commercial applications.

In order to produce polyhydroxyalkanoates (PHAs) with molecular weight as close as possible to the original molecular weight, i.e. of the PHA when inside the cell, it is important to consider the case in which the PHA solvents need to be heated above 70° C. to solubilize the biopolymer; the longer it remains exposed to this temperature during the processing, the more it will degrade, which fact can irremediably impair its thermoplastic properties, as discussed in the previous patent application mentioned above PI04005622-1 (PCT/BR04/000237), of the same applicant.

For example, the polyhydroxybutyrate, originally containing a molecular weight of 1,000,000 Da and submitted to an extraction in isoamyl alcohol at 110° C. would yield, for a time of 5 minutes of exposure, 951,230 Da; for 15 minutes of exposure, 853,692 Da; for 30 minutes of exposure, 707,410 Da; for 60 minutes, 414,771 Da; and for 90 minutes, 122,230 Da.

Considering that, besides the extraction, other operations, such as evaporation and drying of the solvent are necessary to obtain a pure product with good mechanical properties, and that these operations many times expose the biopolymer to critical situations regarding the material, it is not difficult to imagine the inherent difficulties of processing this type of material. Besides the solvent, it is desirable to have an appropriate process that does not degrade the product thermally.

Bearing in mind the biopolymer heat sensitiveness and for purposes of producing material with high molecular weight, it should be taken into account that the potential for industrial utilization of the solvents, for example the solvents mentioned in U.S. Pat. No. 6,043,063, is intimately related to the time of exposure of the biopolymer during the process of extraction and recovery to those high temperatures which will define the thermal degradation level suffered by the biopolymer. In the cited patents, there is no reference to the obtained material properties, especially that related to the product molecular weight.

Other relevant fact regarding the industrial viability of this mode of PHA extraction is that, since it is a process of intensive energy consumption, the viability of the product is also intimately related to the availability of a low cost renewable source of energy. Considering the facts exposed above, it is possible to conclude that the industrial processes for producing PHAs should contemplate: strains of microorganisms presenting high efficiency in converting raw material into polymer, with a simple and efficient production protocol; raw materials of low cost and high yield; a procedure for extracting and purifying the polymer which allows obtaining a product of high purity, preserving at maximum the original characteristics of the biopolymer, with high yield and efficiency and through processes that are not aggressive to the environment.

Besides these economical aspects, since it is a more environmental friendly product, the whole process thereof should be compatible. Thus, the use of environmental harmful products in any production step should be avoided. Moreover, the source of energy used to run the process of production should come from a renewable source. It would not make sense to produce a plastic of low environmental impact if, for example, only non-renewable sources of energy are employed.

A renewable and cheap energy allied with the availability of cheap raw materials—sugar and molasses—and natural solvents obtained as by-products of the alcoholic fermentation makes the sugar and alcohol industry the ideal cradle for the production of bioplastic.

Aiming to efficiently obtain a PHA with high purity and high molecular weight from raw material of low cost, the previous patent application PI 04005622-1 (PCT/BR2004/000237) of the same applicant proposes a process for recovering PHAs from a bacterial cellular biomass, which is obtained by fermentation, said process presenting characteristics of non-aggression to the environment, by employing non-halogenated solvents.

Considering the suitability of the solvents for carrying out the process, the latter uses, as raw material, a cellular biomass slurry in aqueous suspension and with a dry cellular material content not inferior to about 18 by weight, which slurry is submitted to a solvent, agitation and heating in a reactor, in order to produce a suspension comprising solvent and dissolved PHA, which is subsequently separated, still hot, from the insoluble residues of the remaining cellular biomass. Then, the PHA and solvent solution is cooled to a temperature that allows the precipitation of the PHA and is submitted to a micro-filtration, in order to obtain a PHA paste with a PHA concentration of about 5% or more, which paste is heated and agitated again by injection of water vapor, in order to eliminate the solvent and to form an aqueous suspension of PHA granules, which will be submitted to a final separation.

Making use of the suggested solvents in the previous process described above, the concentration of dissolved PHA in the solvent is inferior to 5%, requiring a micro-filtration operation in order to allow said PHA concentration in the suspension to reach a minimum value, allowing the continuity of the process in terms of economical viability. In order to preserve the biopolymer molecular weight, the solution is rapidly cooled before being micro-filtrated.

Thus, in the previous process the requirement of energy is relatively large, because the large volume of diluted suspension originally heated is cooled and then re-heated before the solvent evaporation.

Moreover, this process requires facilities provided with high cost equipments necessary to carry out the rapid cooling and the micro-filtration steps.

Considering the low PHA solubility in the mentioned solvents, the volume of the circulating solvents required in this process is high, requiring pumping plant and larger equipment, besides higher quantities of electric and thermal energy for operation thereof and to solvent evaporation.

SUMMARY OF THE INVENTION

From the above, it is a generic objective of the present invention to provide a process for recovering PHAs from bacterial cellular biomass, obtained through fermentation, using non-halogenated solvents which are non-aggressive to the environment, in order to generate, by means of relatively simplified facilities and lower energetic consumption, a product of high purity and high molecular weight using renewable raw material and energy.

According to the invention, the process in question comprises the steps of:
i) submitting the cellular biomass to concomitant operations of injection of PHA solvent, vigorous agitation and rapid heating in the interior of a reactor in order to promote rupture of the wall of the biomass cells and dissolution of the PHA contained in the latter, and to form a suspension comprising PHA solvent enriched with PHA dissolved in a concentration of at least 2%, preferably above 5% by weight of the suspension, and insoluble residues of the cellular biomass(debris);
ii) submitting the suspension formed in the reactor to a separating step for recovering the solvent enriched with the dissolved PHA from the insoluble residues of the remaining cellular biomass;
iii) submitting the solution of PHA solvent enriched with PHA to operations of agitation and washing with water and/or steam at a temperature which is sufficient and appropriate to promote the removal, through evaporation, of substantially all PHA solvent and the precipitation of the PHA, in order to form a suspension comprising PHA precipitated in water and remaining solvent;
iv) submitting the suspension of the precipitated PHA to evaporation of the remaining solvent until depletion thereof by injecting steam in said PHA suspension, in order to obtain particles of purified PHA in aqueous suspension;
v) cooling the suspension in aqueous medium, from which the PHA solvent was depleted, to about 45° C. or less, and separating the PHA particles from said suspension; and
vi) submitting the separated PHA particles to a drying step.

In order to extract the PHA from the fermented cellular biomass, the process proposed herein makes use of at least one of the solvents selected from the following groups: group 1: methyl formiate, ethyl formiate, propyl formiate, butyl formiate, isoamyl formiate, pentyl formiate and caproyl formiate (or hexyl); group 2: isopropyl propionate, isoamyl propionate, caproyl propionate (or hexyl); group 3: methyl butyrate, propyl butyrate, isopropyl butyrate, isoamyl butyrate, pentyl butyrate(amyl), caproyl butyrate (or hexyl); group 4: methyl isobutyrate, ethyl isobutyrate, butyl isobutyrate, propyl isobutyrate, isopropyl isobutyrate, isoamyl isobutyrate, pentyl isobutyrate(amyl), caproyl isobutyrate; group 5: propyl valerate, isopropyl valerate, butyl valerate, isobutyl valerate, isoamyl valerate(valerate of 3-methyl-1-butyl), pentyl valerate(amyl) and caproyl valerate (or hexyl); and group 6: methyl isoamylate(isovalerate)(3-methyl-1-methyl butanoate), ethyl isoamylate(isovalerate)(3-methyl-1-ethyl butanoate), propyl isoamylate(isovalerate)(3-methyl-1-propyl butanoate), isopropyl isoamylate(isovalerate)(3-methyl-1-isopropyl butanoate), butyl isoamylate(isovalerate) (3-methyl-1-butyl butanoate), isobutyl isoamylate (isovalerate)(3-methyl-1-isobutyl butanoate), isoamyl isoamylate(isovalerate)(3-methyl-1-isoamyl butanoate), pentyl isoamylate(isovalerate)(amyl)(3-methyl-1-pentyl or amyl butanoate) and caproyl isoamylate(isovalerate)(hexyl).

The process as described is relatively simple, utilizes renewable source of energy and raw material, since it is associated with alcohol and sugar production from sugarcane, it is compatible with the environment and human health and defines an economical alternative for extracting and recovering polyhydroxyalkanoates (PHAs) in large scale.

BRIEF DESCRIPTION OF THE DRAWINGS

The invention described below presents its steps illustrated by way of example in a flowchart, which is represented in the single FIG. 1 of the enclosed drawing.

DETAILED DESCRIPTION OF THE INVENTION

A list of definitions of terms used in the description of the present invention is described below:
"Alkenyl" means an unsaturated carbonic chain, from C1 to $C_n$, where n varies from 2 to about 20, which carbonic chain may be linear, branched or cyclic and the unsaturation may be monounsaturated, i.e., with a double or triple bond in the carbonic chain; or polyunsaturated, i.e., with two or more double bonds, or with two or more triple bonds, or still with one or more double bonds and one or more triple bonds in the carbonic chain.
"Alkyl" means a saturated carbonic chain, from $C_1$ to $C_n$, where n varies from 2 to about 20, which carbonic chain may be straight, branched or cyclic.
"Cellular Biomass" means a biomass originating from any microorganism or plant, which is able to produce PHA naturally or by genetic modification, in order to render it a PHA producer or make it produce more PHA.
"Comprises" or "to Comprise" means that other steps, or other stages, or other compounds, or other ingredients, which do not affect the end result, may be added or be present. This term may also be substituted by, or substitute the terms: "constituted of", "constituted by", "essentially constituted of" and "essentially constituted by".
"Da" means Dalton, the unit for measuring the molecular weight of polymers.
"To extract polyhydroxyalkanoates from a biomass" or "Extraction of polyhydroxyalkanoates from a biomass" means to extract or the extraction of a determined PHA produced by a biomass that produces a single type of PHA, and additionally it may also mean to extract or the extraction of more than one type of PHA produced by a biomass, for situations in which the PHA producing cellular biomass produces more than only one type of PHA.

"Coarse Extract" means the suspension constituted by the PHA solvent enriched with the PHA extracted from the PHA cellular mass containing, dissolved therein, water and impurities extracted from the cellular mass, and by the insoluble solids, which is the residue of the cellular biomass from which the PHA was extracted.

"Substantially Atmospheric Pressure" means a pressure very close to the atmospheric, i.e., equal, slightly superior or inferior to the atmospheric pressure.

"Extraction Reactor" means the equipment in which the operation of extracting PHA from the PHA producing cellular biomass is processed.

"Rapidly cooling" a stream (solution or suspension) means: to cool this stream (solution or suspension) in some seconds, by expansion, through heat exchange with another cooler stream and/or by cooling by means of heat exchangers.

"Solvent" means a substance capable to dissolve other substance denominated solute, in order to form a mixture denominated solution, of a solute uniformly dispersed in the solvent, regarding molecular size or ionic size.

"PHA Solvent" means a substance capable to dissolve polyhydroxyalkanoates.

"Enriched PHA Solvent" or "enriched PHA solvent solution" means a PHA solvent solution containing the PHA extracted from the PHA producing cellular biomass.

"Virtually free of" or "practically free of" means "to have very small quantity of" or "to have presence of traces of" or "to have a non-significant quantity of" or "to have an almost imperceptible quantity of". There are a relatively large number of publications that describe the PHA extraction by means of non-halogenated solvents from microorganism or vegetal biomass sources. However, when it is desired to apply the described teachings in a commercial scale, there is a great difficulty in obtaining a product in which the original properties of the intracellular biopolymer are substantially preserved, which characteristics are most of the time fundamental to elaborate commercial products. It is observed that in most of said publications, little attention is given to the thermo-sensitiveness of the product at high temperatures. Most non-halogenated solvents mentioned as candidates to be used in PHA extraction present low solubility for this solute and require high temperatures, normally above 70° C., for PHA extraction and recovery. When it is desired to process the PHA extraction with such solvents in commercial scale, the times necessary for PHA recovery are usually too long, degrading it thermally in an irreversible manner. The product thus obtained, depending on the time of exposure at high temperature, becomes restricted to a very limited number of applications in industry, or even to any other application at all.

The present invention refers to a industrial scale process, in which the processing steps are combined in such a way as to allow: a) minimizing the time of exposure of most PHA extracted from the cellular biomass at high temperatures, using non-halogenated solvents, allowing to minimize its degradation, in order to preserve at maximum its original properties, especially its molecular weight; b) obtaining a product of high purity, normally superior to 99%, preserving the natural color of the biopolymer and with the virtual absence of residual solvent, with no need of including in the process specific additional steps of decolorizing and purifying the produced PHA; c) obtaining a high level of PHA recovery from the biomass, normally superior to 90%; d) using, in an integrated manner, renewable raw materials and energy sources originated from the sugar and alcohol industry, allowing to increase the profits of the industrial groups that produce sugar and alcohol.

The methods of the present invention can be applied to PHAs produced by natural or genetically modified microorganisms or plants, or to synthetically produced PHAs. The polyhydroxyalkanoate or PHA is a polymer constituted by repetitions of the following unit:

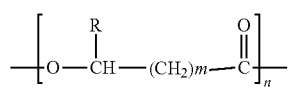

where R is an alkyl or alkenyl group of variable length and m and n are integers, in the polymers mentioned above R and m assuming the following values:
PHB: R=$CH_3$, m=1
PHB-V: R=$CH_3$ or $CH_3$—$CH_2$—, m=1
P4HB: R=H, m=2
P3HB-4HB: R=H or $CH_3$, m=1 or 2
PHHX: R=$CH_3$—$CH_2$—$CH_2$—, m=1

This invention is applied to PHAs recovered from biomass of microorganisms, preferably to PHB (poly-3-hidroxybutyrate), PHB-V (poly(hydroxybutyrate-co-hydroxyvalerate)), P4HB (poly-4-hydroxybutyrate, P3HB4HB (poly(3-hydroxybutyrate-co-4-hydroxybutyrate)) and some PHAmcl (polyhydroxyalkanoates of medium chain), the typical representative of this last family being the PHHX (polyhydroxyhexanoate).

Process for Extracting PHAs by Using Non-Halogenated Solvents, with Short Time of Exposure of the Biopolymer to the Thermal Degradation Condition The present invention refers to a process, which uses a fermented material of bacterial cellular biomass, obtained through fermentation, and which in an extraction step is submitted to concomitant operations of injection of PHA solvent preferably in the heated liquid form and vapor form, of vigorous agitation and rapid heating in a reactor, in order to rapidly provoke heating of the cellular biomass to a temperature between about 90° C. until the boiling temperature of the solvent, at the substantially atmospheric pressure, and the dissolution of PHA contained in the biomass, and to generate a coarse extract defined by a suspension comprising enriched PHA solvent with PHA dissolved in a concentration of at least 2% and frequently superior to 5% by weight of the suspension, and insoluble residues of the cellular biomass.

In a preferred form of the invention, in which the bacterial cellular biomass is introduced in the dried form into the extraction operation, the coarse extract obtained in the extraction step is constituted by a liquid phase, which comprises PHA solvent enriched with PHA, and a solid phase which is defined by insoluble residues of the residual cellular biomass (debris).

In another way of carrying out the invention, the bacterial cellular biomass is conducted to an extraction step in an aqueous suspension form, preferably concentrated above 10% of dry material (weight/weight) therein and also denominated slurry, in order to obtain a coarse extract consisting of a liquid phase which comprises PHA solvent enriched with PHA and remaining water of the cellular biomass; a solid phase defined by the insoluble residues of the residual cellular biomass; and a vapor phase containing water and PHA solvent vapors. The water and PHA solvent vapors, which are generated in several process steps, are condensed and separated in two liquid phases: a rich-solvent phase, which returns to the process in the PHA extracting and recovering phase; and a poor-solvent phase, which is re-circulated in the process to allow recovering the PHA solvent contained therein.

This procedure, besides heating the cellular biomass, also promotes the effect of removing the excess of water supplied with the slurry in the form of a vapor, which is a binary mixture consisting of PHA solvent and water. The vapor phase, substantially containing most part of the water introduced with the biomass in the reactor, can be then extracted from the reactor to be subsequently condensed, leaving behind a suspension consisting of a solution of PHA solvent enriched with PHA and a small fraction of water dissolved in the solvent, besides insoluble residues of the extracted cellular biomass.

In the process for extracting and recovering PHA at least one PHA solvent is used, selected from the following groups:

Group 1 of solvents consisting of: methyl formiate, ethyl formiate, propyl formiate, butyl formiate, isoamyl formiate, pentyl formiate(amyl) and caproyl formiate (or hexyl) and mixtures of these solvents, more preferably propyl formiate, butyl formiate, isoamyl formiate, pentyl formiate and even more preferably isoamyl formiate.

Group 2 of solvents consisting of: ethyl propionate, isopropyl propionate, isoamyl propionate, caproyl propionate (or hexyl) and mixtures of these solvents and more preferably isopropyl propionate, isoamyl propionate and even more preferably isoamyl propionate.

Group 3 of solvents consisting of: methyl butyrate, propyl butyrate, isopropyl butyrate, isoamyl butyrate, pentyl butyrate(amyl), caproyl butyrate (or hexyl) and mixtures of these solvents and more preferably propyl butyrate, isopropyl butyrate, isoamyl butyrate, pentyl butyrate (amyl) and even more preferably isoamyl butyrate(butyrate of 3-methyl-1-butyl).

Group 4 of solvents consisting of: methyl isobutyrate, propyl isobutyrate, isopropyl isobutyrate, isoamyl isobutyrate, pentyl isobutyrate(amyl), caproyl isobutyrate (or hexyl) and mixtures of these solvents and more preferably propyl isobutyrate, isopropyl isobutyrate, isoamyl isobutyrate, pentyl isobutyrate(amyl) and even more preferably isoamyl isobutyrate(isobutyrate of 3-methyl-1-butyl).

Group 5 of solvents consisting of: propyl valerate, isopropyl valerate, butyl valerate, isobutyl valerate, isoamyl valerate(3-methyl-1-butyl), pentyl valerate(amyl) and caproyl valerate (or hexyl) and mixtures of these solvents and more preferably propyl valerate, isopropyl valerate, butyl valerate, isobutyl valerate, isoamyl valerate, pentyl valerate(amyl) and even more preferably isoamyl valerate.

Group 6 of solvents consisting of: methyl isoamylate(isovalerate)(3-methyl-1-methyl butanoate), ethyl isoamylate(isovalerate)(3-methyl-1-ethyl butanoate), propyl isoamylate(isovalerate)(3-methyl-1-propyl butanoate), isopropyl isoamylate(isovalerate)(3-methyl-1-isopropyl butanoate), butyl isoamylate(isovalerate)(3-methyl-1-butyl butanoate), isobutyl isoamylate(isovalerate)(3-methyl-1-isobutyl butanoate), isoamyl isoamylate (isovalerate)(3-methyl-1-isoamyl butanoate), pentyl isoamylate(isovalerate)(amyl)(3-methyl-1-pentyl or amyl butanoate) and caproyl isoamylate(isovalerate) (hexyl), and mixtures of these solvents and more preferably propyl isoamylate(isovalerate), isopropyl isoamylate(isovalerate), butyl isoamylate(isovalerate), isobutyl isoamylate(isovalerate), isoamyl isoamylate (isovalerate), pentyl isoamylate(isovalerate)(amyl) and even more preferably isoamyl isoamylate(isovalerate).

In any at the invention forms, the obtained coarse extract, which is effluent from the extraction step, is then submitted to a process of separating insoluble solids from the PHA solvent solution enriched with PHA, for example, by filtration, centrifugation, more preferably by filtration, which generates a filtrated stream free of insoluble solids and comprising the PHA solution enriched with PHA and a cake containing the separated insoluble solids.

The use of the solvents considered herein allows the PHA solvent suspension enriched with dissolved PHA to present a PHA concentration of at least about 2% by weight and, for a relevant part of the chosen solvents, at least superior to about 5% by weight of the suspension. When the used solvents are those with PHA solubility equal or superior to about 5% by weight, the step of removing the solvent from the PHA solution is conducted without passing through intermediate steps of cooling and microfiltrating. The solution containing dissolved PHA and free of insoluble residues of biomass, preferably at the extraction temperature, is then fed into a steam flow, in a preferably pulverized manner and then instantaneously expanded in a reactor, which is maintained at a pressure ranging from vacuum to the substantially atmospheric pressure, preferably vacuums from 100 to 600 mm Hg°, in which are generated: a binary vapor flow containing water and a substantial part of the PHA solvent which is part of the fed solution, and a suspension of finely divided PHA particles in water and fraction of residual solvent resulting from the condensation of part of the introduced vapor. This suspension is then submitted to evaporation of the final residual solvent until depletion thereof in the remaining liquid (mother liquor), through the injection of steam. Thus, at the end of the process, a suspension of PHA particles is obtained, finely dispersed in water. This suspension is then rapidly cooled to about 45° C. or less and submitted to a process for separating the PHA particles dispersed in this suspension, for example by filtrating and rinsing the filtrated cake, containing the PHA particles, with water substantially free of solvent. The thus obtained PHA particles are then submitted to a drying process, obtaining PHA in powder form, presenting high level of purity, very low level of residual solvent, color, ashes and impurity and a high global yield, i.e., a PHA quantity recovered in relation to the PHA contained in the original biomass, superior to about 90% (weight/weight) and molecular weights above 300,000 Da, normally from 400,000 to 800,000 Da.

According to the invention, the removal of the solvent from the PHA solution is carried out in an evaporation chamber by directly pulverizing the PHA solution in a steam flow, followed by PHA precipitation in the solvent and water mixture.

According to a way of carrying out the invention, the steam used for removing solvent from the PHA solution is a superheated steam in relation to the operational pressure in the evaporation chamber. It should be understood that the evaporation chamber could be maintained at a pressure inferior to the atmospheric pressure or at a substantially atmospheric pressure.

In another way of carrying out the invention, the removal of solvent from the PHA solution is carried out by directly injecting the solution into water and steam, and heating under agitation in a reactor maintained at a pressure inferior to the atmospheric pressure or at a substantially atmospheric pressure.

In the present invention, the solvents selected and belonging to the groups from 1 to 6 can be obtained for example, through known reactions of organic synthesis between an alcohol and a carboxyl acid in the presence of an acid catalyzer (ion $H^+$) and denominated esterification reactions (MORRISON, R. e BOYD, R., Química Orgânica, $9^a$ ed., Fundação Calouste Gulbenkian, Lisboa, Portugal, p. 991-1016, 1990 e Solomons, T. W. G., Organic Chemistry, $2^a$ ed., John Wiley & Sons, Inc., New York, USA, p. 749-801, 1980).

Particularly in group 6, in which the acid involved in the esterification reaction is 3-methyl-1-butanoic acid or isoamyl acid, it should be emphasized that it can be obtained for example by acid-catalyzed oxidation, isoamyl alcohol (3-methyl-1-butanol), primary alcohol, through a phase transfer catalysis process as detailed in the traditional organic chemistry literature (for example, MORRISON., R e BOYD, R., Química Organica, $9^a$ ed., Fundação Calouste Gulbenkian, Lisboa, Portugal, p. 616-618 e 471-472, 1990 e Solomons, T. W. G., Organic Chemistry, $2^a$ ed., John Wiley & Sons, Inc., New York, USA, p. 654-657, 1980).

The utilization of the selected solvents described above presents the advantage of solubilizing about 2-20 times the PHA than for example those solvents described in patent PI 9302312-0, in patent application PI 04005622-1 (PCT/BR04/000237) and in U.S. Pat. No. 6,043,063 such as, for example, isoamyl acetate, butyl acetate, 1-hexanol, amyl alcohol, isoamyl alcohol and propyl propionate. The solubility degree depends on the solvent used and the chosen extraction temperature.

The good solubility achieved with the solvents selected as object of this invention associated with the methodology described herein, allows:

a) obtaining a rapid and efficient extraction of PHA from biomass of microorganisms;
b) instantaneously evaporating a substantial quantity of the solvent contained in the PHA solution injected in the steam flow and expanded in an evaporation chamber, preferably under vacuum, in which a relevant part of the sensible heat contained in the fed PHA solution is recovered, at the same time as it promotes the precipitation of PHA in water condensed from the vapor, which is simultaneously cooled by the vapor and which is leaving the system; the latter containing part of the water admitted by the injected steam and a substantial quantity of the solvent then contained in the PHA solution fed jointly therewith;
c) for solvents with PHA solubility equal or superior to 5% by weight, by using a step as described in item b, eliminating additional steps of PHB cooling, crystallization or precipitation, and mechanic concentration (or by membranes), remarkably reducing the evaporation unit of the PHB suspension in solvent, simultaneously dispensing the need of adding a PHA insolubilizing agent (counter-solvent);
d) for solvents which PHA solubility between about 2% and about 5% by weight, by using a step as described in item b, reducing the size of the PHB cooling, crystallization and precipitation, and mechanic concentration (or by membranes), by dispensing the need of adding a PHA insolubilizing agent (counter-solvent);
e) through steam action, as described in item b, rapidly evaporating the solvent and precipitating PHA, which reduces the possibilities of causing damages to the molecular weight, simultaneously removing by thermo-mechanic action the impurities dissolved in the PHA solvent when in contact therewith, dislocating them to the water phase; further allowing to obtain finely divided PHA particles, which facilitates the removal of the residual solvent and impurities and, also, the subsequent drying operation;
f) through the impelling action of the vapor, according to the process described in item b, promoting the pulverization of the PHA solution in the steam flow; and
g) significantly reducing the circulating solvent quantities required in the PHA extraction process, which implies a proportional size reduction of a substantial part of the equipment that can be industrially used, and which besides promoting an accentuated reduction in thermal and electric energy consumption required in the process, allows significantly reducing the investments in the process of extraction and purification.

EXAMPLES

Example 1

PHB Extraction and Recovery Using Isoamyl Propionate as Solvent

To a 500 mL round bottom distillation flask, 50 g of concentrated biomass of *Alcaligenes eutrophus*, containing 78.4% dry material and 58.8% PHB with molecular weight of 1,000,000 Da, and 300 g of isoamyl propionate were added. The suspension was then submitted, under agitation, to evaporation of a fraction of solvent and water, by using a heating blanket coupled to the distillation flask. The thus generated binary vapor was conducted to a straight tube condenser (Liebig type) for condensation and the resulting condensate was collected in an Erlenmeyer recipient. The suspension was maintained in an evaporation process under agitation until reaching the extraction temperature. The temperature was read in a mercury thermometer affixed to one of the flask nozzles and maintained in contact with the vapor phase inside the flask. The extraction temperature was reached after an evaporation time of about 3 minutes had elapsed, the boiling temperature of the mixture passing from about 95° C. (initial temperature) to about 115° C. (extraction temperature). The suspension was then maintained in a condensate reflux regime under agitation for about 5 minutes at the temperature of 115° C. (extraction temperature) and then, still heated, being filtrated in a filter paper for separating the insoluble part from the part dissolved in the filtrated solvent. The hot filtrated material containing about 8.82% (w/w) solubilized PHB was then cooled for PHB precipitation, was concentrated through filtration, submitted to evaporation of the solvent and afterwards to drying. The obtained PHB presented a molecular weight of about 558,000 Da. The quantity of concentrated biomass used in the tests was about 2.0-3.5 times greater than the quantity needed to reach the concentration of PHB saturation in the solvent at the extraction temperature employed. Thus, the concentration of the solute (PHB) saturation in the solvent (isoamyl propionate) for the employed extraction temperature could be determined.

Example 2

PHB Extraction and Recovery Using Propyl Butyrate as Solvent

To a 500 mL round bottom distillation flask, 50 g of concentrated biomass of *Alcaligenes eutrophus*, containing 78.4% dry material and 58.8% PHB with molecular weight of 1,000,000 Da, and 300 g of propyl butyrate were added. The suspension was then submitted, under agitation, to evaporation of a fraction of the solvent and water, by using a heating blanket coupled to the distillation flask. The thus generated binary vapor was conducted to a straight tube condenser (Liebig type) for condensation and the resulting condensate was collected in an Erlenmeyer recipient. The suspension was maintained in an evaporation process under agitation until reaching the extraction temperature. The temperature was read in a mercury thermometer affixed to one of the flask nozzles and maintained in contact with the vapor phase inside the flask. The extraction temperature was reached after an evaporation time of about 3 minutes had elapsed, the boiling temperature of the mixture passing from about 98° C. (initial temperature) to about 120° C. (extraction temperature). The suspension was then maintained in a condensate reflux regime under agitation for about 5 minutes at the temperature of 120° C. (extraction temperature) and then, still heated, being filtrated in a filter paper for separating the insoluble part from the part dissolved in the filtrated solvent. The hot filtrated material containing about 3.0% (w/w) solubilized PHB was then cooled for PHB precipitation, was concentrated through filtration, submitted to evaporation of the solvent and afterwards to drying. The obtained PHB presented a molecular weight of about 638,000 Da. The concentrated biomass used in the tests was added in excess of about 2.0-3.5 times greater than the quantity needed to reach the concentration of PHB saturation in the solvent at the extraction temperature employed. Thus, the concentration of the solute (PHB) saturation in the solvent (propyl butyrate) for the employed extraction temperature could be determined.

Example 3

PHB Extraction and Recovery from Dry Biomass Using Isoamyl Valerate as Solvent

To a 500 mL round bottom distillation flask, 50 g of concentrated biomass of *Alcaligenes eutrophus*, containing 78.4% dry material and 58.8% PHB with molecular weight of 1,000,000 Da, and 300 g of isoamyl valerate were added. The suspension was then submitted, under agitation, to evaporation of the solvent and water, by using a heating blanket coupled to the distillation flask. The thus generated binary vapor was conducted to a straight tube condenser (Liebig type) for condensation and the resulting condensate was collected in an Erlenmeyer recipient. The suspension was maintained in an evaporation process under agitation until reaching the extraction temperature. The temperature was read in a mercury thermometer affixed to one of the flask nozzles and maintained in contact with the vapor phase inside the flask. The extraction temperature was reached after an evaporation time of about 3 minutes had elapsed, the boiling temperature of the mixture passing from about 98° C. (initial temperature) to about 130° C. (extraction temperature). The suspension was then maintained in a condensate reflux regime under agitation for about 10 minutes at the temperature of 130° C. (extraction temperature) and then, still heated, being filtrated in a filter paper for separating the insoluble part from the part dissolved in the filtrated solvent. The hot filtrated material containing about 27.8% (w/w) solubilized PHB was then cooled for PHB precipitation, was concentrated through filtration, submitted to evaporation of the solvent and afterwards to drying. The obtained PHB presented a molecular weight of about 735,000 Da. The concentrated biomass used in the tests was added in excess of about 2.0-3.5 times greater than the quantity needed to reach the concentration of PHB saturation in the solvent at the extraction temperature employed. Thus, the concentration of the solute (PHB) saturation in the solvent (isoamyl valerate) for the employed extraction temperature could be determined.

Example 4

PHB Extraction and Recovery from Dry Biomass Using Isoamyl Isoamylate(Isovalerate)(3-methyl-1-butanoate of 3-methyl-1-butanol) as Solvent To a 500 mL round bottom distillation flask, 50 g of concentrated biomass of *Alcaligenes eutrophus*, containing 78.4% dry material and 58.8% PHB with molecular weight of 1,000,000 Da, and 300 g of isoamyl isoamylate(isovalerate) (3-methyl-1-butanoate of 3-methyl-1-butanol) were added. The suspension was then submitted, under agitation, to evaporation of the solvent and water, by using a heating blanket coupled to the distillation flask. The thus generated binary vapor was conducted to a straight tube condenser (Liebig type) for condensation and the resulting condensate was collected in an Erlenmeyer recipient. The suspension was maintained in an evaporation process under agitation until reaching the extraction temperature. The temperature was read in a mercury thermometer affixed to one of the flask nozzles and maintained in contact with the vapor phase inside the flask. The extraction temperature was reached after an evaporation time of about 3 minutes had elapsed, the boiling temperature of the mixture passing from about 98° C. (initial temperature) to about 125° C. (extraction temperature). The suspension was then maintained in a condensate reflux regime and under agitation for about 10 minutes at the temperature of 125° C. (extraction temperature) and then, still heated, being filtrated in a filter paper for separating the insoluble part from the part dissolved in the filtrated solvent. The hot filtrated material containing about 9.8% (w/w) solubilized PHB was then cooled for PHB precipitation, was concentrated through filtration, submitted to evaporation of the solvent and afterwards to drying. The obtained PHB presented a molecular weight of about 575,000 Da. The concentrated biomass used in the tests was added in excess of about 2.0-3.5 times greater than the quantity needed to reach the concentration of PHB saturation in the solvent at the extraction temperature employed. Thus, the concentration of the solute (PHB) saturation in the solvent (isoamyl isovalerate) for the employed extraction temperature could be determined.

The invention claimed is:
1. A process for extracting and recovering polyhydroxyalkanoates (PHAs) from a bacterial cellular biomass that has been obtained by fermentation, comprising the steps of:
   i) submitting the cellular biomass to concomitant operations of: injecting a liquid form PHA solvent and a vapor form PHA solvent into the cellular biomass, vigorously agitating and rapidly heating the biomass in the interior of a reactor to form a suspension comprising the PHA solvent enriched with PHA at a concentration of at least 2% by weight of the suspension and insoluble residues of the cellular biomass;
   ii) submitting the suspension on to a separating step for recovering the solvent enriched with the dissolved PHA from the insoluble residues of the remaining cellular biomass;
   iii) submitting the solution of PHA solvent enriched with PHA to agitation and washing with water and/or steam at a temperature sufficient to evaporate substantially all PHA solvent and precipitate the PHA;

iv) evaporating the remaining solvent from the precipitated PHA, until depletion thereof, by injecting steam in said PHA suspension, in order to obtain particles of purified PHA in aqueous suspension;

v) cooling the suspension in aqueous medium, from which the PHA solvent was depleted, to about 45° C. or less, and separating the PHA particles from said suspension; and vi) submitting the separated PHA particles to a drying step, wherein the PHA solvent is isoamyl propionate.

2. The process as set forth in claim 1 wherein the PHA is produced by bacterial fermentation, using microorganisms which are able to biosynthesize PHA from sugars extracted from sugarcane wherein the main energy source supplying the process is sugarcane bagasse.

3. The process as set forth in claim 1, wherein the step of injecting the liquid PHA solvent and the PHA solvent in the form of vapor promotes heating of the cellular biomass at a temperature between about 90° C. and the boiling temperature of the solvent at a substantially atmospheric pressure.

4. The process as set forth in claim 1, wherein the removal of the solvent from the PHA solution is carried out in an evaporation chamber under direct pulverization of the PHA solution in a steam flow, followed by the PHA precipitation in the mixture of condensed water and solvent.

5. The process as set forth in claim 4, wherein the steam used for removing solvent from the PHA solution by evaporation, by directly injecting the solution in a steam flow, is a superheated steam in relation to the operational pressure in the evaporation chamber.

6. The process as set forth in claim 4, wherein the removal of the solvent from the PHA solution is carried out by directly injecting the solution in a steam flow and in the evaporation chamber maintained at a pressure inferior to the atmospheric pressure.

7. The process as set forth in claim 4, wherein the removal of the solvent from the PHA solution is carried out by directly injecting the solution in a steam flow and in the evaporation chamber maintained at a substantially atmospheric pressure.

8. The process as set forth in claim 1, wherein the removal of the solvent from the PHA solution comprises directly injecting the solution in water and steam and heating under agitation in a reactor maintained at a pressure inferior to the atmospheric pressure.

9. The process as set forth in claim 4, wherein the removal of the solvent from the PHA solution is carried out by directly injecting the solution in water and steam, and heating under agitation in a reactor maintained at a substantially atmospheric pressure.

10. The process as set forth in claim 1, wherein the biomass used in the extracting process is in an aqueous suspension form.

11. The process as set forth in claim 10, wherein the PHA solvent forms with water, in a vapor phase, a binary mixture.

12. The process as set forth in claim 11, wherein the step of injecting the liquid PHA solvent and the PHA solvent in vapor form, promotes heating of the cellular biomass to a temperature between about 90° C. and the boiling temperature of the solvent at atmospheric pressure and to form: a liquid phase comprising PHA solvent enriched with PHA and remaining water of the cellular biomass; a solid phase defined by the insoluble residues of the residual cellular biomass; and a vapor phase containing water and PHA solvent vapors.

13. The process as set forth in claim 12, further comprising the step of extracting the vapor phase containing excess water in the cellular biomass.

14. The process as set forth in claim 1, wherein the cellular biomass is originated from natural or genetically modified microorganisms.

* * * * *